US008716409B2

(12) United States Patent
DeDecker

(10) Patent No.: US 8,716,409 B2
(45) Date of Patent: May 6, 2014

(54) CARBOXYLATE TERMINATED POLYMERS AND THEIR USE IN IMPACT-MODIFIED PLASTICS

(75) Inventor: Mark N. DeDecker, North Canton, OH (US)

(73) Assignee: Firestone Polymers, LLC, Akron, OH (US)

( * ) Notice: Subject to any disclaimer, the term of this patent is extended or adjusted under 35 U.S.C. 154(b) by 1359 days.

(21) Appl. No.: 11/617,774

(22) Filed: Dec. 29, 2006

(65) Prior Publication Data

US 2008/0161448 A1    Jul. 3, 2008

(51) Int. Cl.
*C08F 36/06* (2006.01)
*C08F 36/14* (2006.01)
*C08F 4/46* (2006.01)
*C08F 4/48* (2006.01)

(52) U.S. Cl.
USPC ............... 525/331.9; 525/192; 525/332.9; 526/173; 526/335; 526/337

(58) Field of Classification Search
USPC ............ 524/331.9, 336; 525/192, 195, 331.9, 525/332.9; 526/173, 335, 337
See application file for complete search history.

(56) References Cited

U.S. PATENT DOCUMENTS

| 3,070,579 A | 12/1962 | Szware |
| 3,109,871 A | 11/1963 | Zelinski et al. |
| 3,135,716 A | 6/1964 | Uraneck |
| 3,349,071 A | 10/1967 | Strobel |
| 3,451,988 A | 6/1969 | Langer |
| 3,791,888 A | 2/1974 | Hudson |
| 4,034,021 A | 7/1977 | Foss |
| 4,075,186 A | 2/1978 | Ambrose |
| 4,096,254 A | 6/1978 | Benson |
| 4,155,956 A * | 5/1979 | Ballova et al. ............... 525/243 |
| 4,329,439 A | 5/1982 | Lohr, Jr. |
| 4,399,260 A | 8/1983 | Carson |
| 4,417,029 A | 11/1983 | Milkovich |
| 4,503,188 A | 3/1985 | Manicelli |
| 4,518,753 A | 5/1985 | Richards et al. |
| 4,555,547 A | 11/1985 | Ueda et al. |
| 4,555,548 A | 11/1985 | Ueda et al. |
| 4,614,771 A | 9/1986 | Watanabe et al. |
| 4,616,069 A | 10/1986 | Watanabe et al. |
| 4,647,625 A | 3/1987 | Aonuma et al. |
| 4,753,991 A | 6/1988 | Bronstert |
| 4,970,254 A | 11/1990 | Willis et al. |
| 5,028,283 A * | 7/1991 | Willer et al. ............... 149/19.1 |
| 5,063,190 A | 11/1991 | Hargis et al. |
| 5,376,745 A | 12/1994 | Handlin, Jr. |
| 5,395,902 A | 3/1995 | Hall |
| 5,610,227 A | 3/1997 | Antkowiak et al. |
| 5,612,435 A | 3/1997 | Bening et al. |
| 5,728,782 A | 3/1998 | Brady et al. |
| 5,739,254 A | 4/1998 | Fuller et al. |
| 5,792,824 A | 8/1998 | Natori |
| 5,814,709 A | 9/1998 | De Boer et al. |
| 5,827,927 A | 10/1998 | Gagne et al. |
| 5,844,050 A | 12/1998 | Fukahori et al. |
| 5,902,856 A | 5/1999 | Suzuki et al. |
| 7,105,613 B2 | 9/2006 | Graves et al. |
| 2003/0083446 A1 | 5/2003 | DeDecker |
| 2004/0166417 A1 * | 8/2004 | Nishio et al. ............... 429/317 |
| 2004/0220344 A1 | 11/2004 | DeDecker |
| 2004/0220345 A1 | 11/2004 | DeDecker |
| 2005/0131153 A1 | 6/2005 | Graves et al. |
| 2005/0137345 A1 | 6/2005 | DeDecker |
| 2006/0241258 A1 | 10/2006 | Parker et al. |
| 2006/0241265 A1 | 10/2006 | Harwood |

FOREIGN PATENT DOCUMENTS

| DE | 2003128 | 7/1971 |
| EP | 0588287 | 3/1994 |
| EP | 1072613 | 1/2001 |
| GB | 2189253 | * 10/1987 |
| WO | WO 02/79267 | * 3/2002 |
| WO | WO 02/079267 | * 10/2002 |

OTHER PUBLICATIONS

Sartomer Application Bulletin, "Liquid Polybutadiene Resins As Coagents and Modifiers for Elastomers".*
Sarometer Application Bulletin, "Liquid Polybutadiene Resins As Coagents and Modifiers for Elastomers," Date Unknown.*
International Search Report dated Apr. 24, 2008 from corresponding PCT Application No. PCT/US2007/026492 [2 pp.].
Hayashi, Katsumi et al., "Glycols and Dicarboxylic Acids from Butadiene, Isoprene, and Styrene and Some Derived Block Polymers, Esters, and Urethans", Journal of Polymer Science: Part A, vol. 2, pp. 2571-2594 (1964).
Mansson, Per, "Reactions of Polystyryl Anions with Carbon Dioxide and Oxygen. Analysis of Products by Silica Gel Chromatography", Journal of Polymer Science, Pol. Chem. 2d., pp. 1945-1956 (1980).
Quirk, Roderic P. et al., "Functionalization of Polymeric Organolithium Compounds. Carbonation", Makromol. Chem., 183, pp. 2071-2076 (1982).
Wyman, D.P. et al., "Reaction of Polystyryllithium with Carbon Dioxide", Journal of Polymer Science: Part A, vol. 2, pp. 4545-4550 (1964).

(Continued)

*Primary Examiner* — James J Seidleck
*Assistant Examiner* — Deve E Valdez
(74) *Attorney, Agent, or Firm* — Meredith E. Hooker; Nathan T. Lewis

(57) ABSTRACT

A composition includes a baleable polymer resulting from the polymerization of at least one conjugated diene in the presence of an anionic initiator. The baleable polymer has carboxylate termination resulting from the addition of carbon dioxide to terminate the polymerization reaction. The polymer has Mooney $ML_{1+4}$ viscosity of >35 and a solution viscosity of X, where X is >75 cP. The addition of an Ionolizer to a composition that includes the polymer reduces the solution viscosity of the polymer from X to Y where Y meets the following formula: $0.4X \leq Y \geq 0.58X$. The baleable polymer is blended with impact-modified plastics resulting in improved izod values and optical qualities. Processes for making and utilizing the polymer composition, and ionolizer are also described.

54 Claims, No Drawings

(56) References Cited

OTHER PUBLICATIONS

Abstract—Elastomers, vol. 85, p. 55, "Process for Polylithiating Unsaturated Polymers" (1976).
Abstract—Plastics Manual, vol. 121, p. 65, "Olefin Polymers Having a Carboxyl Group on One End and Manufacture Thereof" (1994).
Abstract—Synthetic High Polymers, vol. 117, p. 19, "Melt-metalation of Block Copolymers" (1964).
Abstract—Plastics Fabr. Uses, vol. 107, p. 53, "Modified Block Copolymers and Impact-Resistant Compositions" (1987).
Abstract—Synthetic High Polymers, vol. 114, p. 19, "Functionalized Polymers from Unsaturated Diene-styrene Copolymers by Hydrogenation and Reaction with Functionalizing Agent" (1991).
Abstract—Plastics Manual, vol. 111, p. 67, "Impact-Resistant Blends of Polar Thermoplastic Polymers and Modified Block Copolymers" (1989).
Abstract—Plastics Manual, vol. 87, p. 37, "Manufacture of Telehelic Polymers" (1977).
Abstract—Synthetic High Polymers, vol. 95, "Carboxylation of 'Living' Polymers" (1981).
Abstract—Synthetic High Polymers, vol. 81, "Carboxylation of Polymers Having Alkali Metal Atom at End Groups" (1974).
Abstract—Rubber and Other Elements, vol. 65, "Butadiene Polymers" (1966).
Abstract—115: 72522n, "Functionalization of Polymeric Organolithium Compounds by Carbonation" (Apr. 18, 1991).
Abstract—110: 8848t, "Block Copolymer Grafting Process for Preparing Elastomers Containing Functional Groups" (Jul. 20, 1988).
Zhang, Qian, Jul. 4, 2011 Office Action, with English translation, from Chinese Patent Application No. 200780051893.0 (20 pp.).
English Translation—Decision of Rejection (PCT Application Entering the Chinese National Phase), Chinese Patent Office, Carboxylate Terminated Polymers and Their Use in Impact-Modified Plastics, Appl. No. 200780051893.0, Aug. 3, 2012.
English Translation—Notification of First Office Action (PCT Application Entering the Chinese National Phase), Chinese Patent Office, Carboxylate Terminated Polymers and Their Use in Impact-Modified Plastics, Appl. No. 200780051893.0, Jul. 4, 2011.
English Translation—Notification of Second Office Action, Chinese Patent Office, Carboxylate Terminated Polymers and Their Use in Impact-Modified Plastics, Appl. No. 200780051893.0, Apr. 17, 2012.
English Translation—Office Action, Rospatent FGU FIPS, Appl. Ni. 2009129202/04 (040598), Dec. 2, 2011.
Parmenova, O. A., Aug. 9, 2011 Office Action with English Translation from Russian Patent Application No. 2009129202 ( pp.).
Zhang, Qian, Apr. 17, 2012 Office Action with English Translation from Chinese Patent Application No. 200780051893.0 ( pp.).

* cited by examiner

CARBOXYLATE TERMINATED POLYMERS AND THEIR USE IN IMPACT-MODIFIED PLASTICS

FIELD

This technology relates to carboxylate terminated polymers having specified Mooney and solution viscosities and their use in impact-modified plastics such as high-impact polystyrene (HIPS).

BACKGROUND

Certain impact-modified plastics, such as styrene-maleic anhydride copolymers (SMA's), high impact polystyrenes (HIPS), methylmethacrylate-butadiene-styrene copolymer, transparent impact polystyrene, and acrylonitrile butadiene styrene copolymer, are typically prepared in the presence of a rubber; for example, a polybutadiene or a styrene-butadiene copolymer, to enhance toughness, impact strength and other properties. A low solution viscosity additive rubber can facilitate the dispersion of the rubber in the plastic phase. Moreover, early in polymerization of HIPS, phase separation begins because of the immiscibility of the rubber within the polystyrene being formed and depletion of the styrene phase. Furthermore, in SMAs, a low solution viscosity may improve the clarity and the gloss of the resultant product.

While low solution viscosity of the additive rubber is highly desirable, it makes commercial handling difficult. For example, low solution viscosity typically leads to a liquid or semi-liquid material that is difficult to package and ship. Accordingly, a relatively high bulk viscosity material capable of being baled into a shippable and easy to handle form is desirable.

The commonly assigned U.S. Pat. No. 7,105,613, which is hereby incorporated by reference in its entirety, discloses a polymeization technique for carboxylate termination of rubber polymers to achieve a high bulk viscosity, low solution viscosity rubber compound. This produces a baleable rubber compound that is useful as an additive in plastics.

Yet there remains a need for further improved polymers for use in impact-modified plastics; for example, polymers that contribute to plastics to provide improved Izod impact values, and polymers that may be used in decreased amounts to affect the impact strength of plastic compositions. There is also a need for an additive that can reduce the solution viscosity of the polymer while maintaining a high bulk viscosity so the polymer remains baleable. An additive that can facilitate control of gloss and Izod strength is also desirable.

SUMMARY

The composition includes a baleable polymer resulting from the polymerization of at least one conjugated diene in the presence of an anionic initiator. The baleable polymer has carboxylate termination resulting from the addition of carbon dioxide to terminate the polymerization reaction. The polymer has Mooney $ML_{1+4}$ viscosity of >35 and a solution viscosity of X, where X is >75 cP. Furthermore, the addition of an ionolizer to a composition that includes the polymer reduces the solution viscosity of the polymer from X to Y where Y meets the following formula: $0.4X \leq Y \leq 0.58X$.

A process for utilizing the baleable polymer described in the preceding paragraph to prepare a blend of the polymer composition and an impact-modified plastic includes the steps of: (a) dissolving the baleable carboxylate terminated polymer in a solvent comprising at least one vinyl aromatic compound; (b) optionally adding at least one additional comonomer; (c) adding at least one ionolizer to reduce the solution viscosity of said polymer from X to Y where Y meets the following formula: $0.4X \leq Y \leq 0.58X$; (d) optionally adding at least one additional inert solvent; (e) optionally adding additives selected from the group consisting of extender oils, modifiers, and antioxidants; and (f) initiating polymerzation of the styrene by the use of an initiator and heat, during which phase inversion occurs. The steps (a), (b), (c), (d) and (e) may be performed in any order. Although preferably, step (c) is performed before phase inversion occurs. The impact-modified plastic with which the polymer is blended is selected from the group consisting of high impact polystyrene, styrene-maleic anhydride copolymer, methylmethacrylate-butadiene-styrene copolymer, transparent impact polystyrene, and acrylonitrile butadiene styrene copolymer.

Another composition according to the technology described herein includes a baleable polymer with carboxylate termination wherein said polymer has Mooney $ML_{1+4}$ viscosity of >35 and a solution viscosity of X, where X is >75 cP. The addition of an ionolizer reduces the solution viscosity from X to Y where Y meets the following formula: $0.4X \leq Y \leq 0.58X$, and the polymer results from the polymerization of at least one conjugated diene in the presence of an anionic initiator. The composition further includes an impact-modified plastic for blending with the baleable polymer selected from the group consisting of high impact polystyrene, styrene-maleic anhydride copolymer, methylmethacrylate-butadiene-styrene copolymer, transparent impact polystyrene, and acrylonitrile butadiene styrene copolymer.

Yet another composition according to the technology described herein includes a baleable polymer with carboxylate termination, wherein said polymer has Mooney $ML_{1+4}$ viscosity of >35 and a solution viscosity of N, where X is >75 cP. The addition of an ionolizer to a composition comprising the polymer reduces the solution viscosity of the polymer from X to Y where Y meets the following formula: $0.3X \leq Y \leq 0.58X$. Such polymer results from the batch polymerization of at least one conjugated diene in the presence of an anionic initiator. The composition further includes an impact-modified plastic selected from the group consisting of high impact polystyrene, styrene-maleic anhydride copolymer, methylmethacrylate-butadiene-styrene copolymer, transparent impact polystyrene, and acrylonitrile styrene butadiene copolymer.

Suitable ionolizers for use in the disclosed compositions include an organic acid, an organic acid salt, or mixtures thereof. The addition of the ionolizer to the composition reduces the solution viscosity of the polymer from X to Y.

DETAILED DESCRIPTION

The technology described herein is directed to compositions and processes for providing impact-modified plastics with improved Izod impact values, and for providing polymers that may be used in decreased amounts to provide increased gloss with good impact strength. To effect this, an ionolizer additive is described herein that reduces the solution viscosity of the polymer in a solution. The type of ionolizer that is selected results in different particle sizes and morphology in the impact-modified plastic product. The ionolizer also enables a buyer of a single sample of baleable polymer to obtain portions with varying solution viscosities according to the type and quantity of ionolizer used with the portion. This gives the buyer more flexibility and may allow buying and selling in larger quantities of the baleable polymer with the accompanying benefit of economies of scale.

An example of a baleable polymer is a polymer or copolymer, such as polybutadiene. The baleable polymer has carboxylate termination. The polymer has a relatively high Mooney $ML_{1+4}$ viscosity of >35 and a solution viscosity of X, where X is >75 cP. After addition of an ionolizer to a composition that includes the example polymer in solution, the solution viscosity is reduced from x to y where Y meets the following formula: $0.4X \leq Y \leq 0.58X$. The example baleable polymer may be produced by continuous or batch polymerization processes.

An example of a process for utilizing a baleable polymer to prepare a blend of the polymer composition and an impact-modified plastic includes the steps of; (a) dissolving a baleable carboxylate terminated polymer in a solvent comprising at least one vinyl aromatic compound; (b) optionally adding at least one additional comonomer; (c) adding at least one ionolizer to reduce the solution viscosity of said polymer from X to Y where Y meets the following formula. $0.4X \leq Y \leq 0.58X$; (d) optionally adding at least one additional inert solvent; (e) optionally adding additives selected from the group consisting of extender oils, modifiers, and antioxidants; and (f) initiating polymerization of the styrene by the use of an initiator and heat, during which phase inversion occurs. The steps (a), (b), (c), (d), and (e) may be performed in any order, although step (c) is preferably performed before phase inversion occurs in step (f). The impact-modified plastic with which the polymer is blended is selected from the group consisting of high impact polystyrene, styrene-maleic anhydride copolymer, methylmethacrylate-butadiene-styrene copolymer, transparent impact polystyrene, and acrylonitrile styrene butadiene copolymer.

In one example, a carboxylate terminated elastomer can be prepared by anionic polymerization using lithium initiator and $CO_2$ as terminator. It is believed that the carboxylate terminated elastomer predominately comprises uncoupled polymers with the formula of

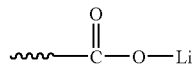

wherein the waved line represents the polymer chain of the elastomer.

It is also possible that the carboxylate terminated elastomer comprises an amount of di-coupled and/or tri-coupled polymers with the formulas of:

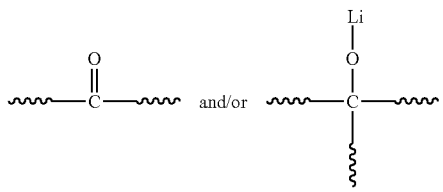

wherein the waved lines represent same or different polymer chains of the elastomer.

The elastomer portion of the carboxylate terminated elastomer includes, for example, conjugated diene rubber; copolymers of a conjugated diene with a vinyl aromatic or a copolymer with less than 50 weight percent of a copolymerizable monomer such as vinyl aromatic compound; elastomeric copolymers of $C_1$-$C_8$ alkyl(meth)acrylate with conjugated diene; elastomeric copolymers of $C_1$-$C_8$ alkyl(meth) acrylates with butadiene and/or styrene; olefin rubbers such as ethylene propylene copolymers (EPR) or ethylene-propylene-diene monomer rubbers (EPDM); ethylene-vinyl acetate rubbers; elastomeric $C_1$-$C_8$ alkyl (meth)acrylates; or combinations comprising at least one of the foregoing elastomers.

Specific examples of conjugated diene monomers that may be used in the elastomer are 1,3-butadiene, isoprene (2-methyl-1,3-butadiene), piperylene (1,3-pentadiene), methyl-1,3-pentadiene, 2,3-dimethyl-1,3-butadiene, 2-methyl-1,3-pentadiene, 2-ethyl-1,3-pentadiene, 3-methyl-1,3-pentadiene, 4-methyl-1,3-pentadiene, 2,4-dimethyl-1,3-pentadiene, 1,3-hexadiene, 2,4-hexadienes, 1,3-heptadiene, and the like, as well as mixtures comprising at least one of the foregoing conjugated diene monomers.

Although conjugated diene homopolymers may be preferred for some applications, copolymers containing at least one conjugated diene may also be highly desirable where the comonomers impart desirable properties and do not detract from the polymer properties. The comonomers may be vinyl arenes, including vinyl aromatic compounds having alkyl, aralkyl, or cycloalkyl groups attached to the aromatic nucleus and preferably having no more than 20 carbon atoms.

In an embodiment, the carboxylate terminated elastomer comprises conjugated diene copolymerized with one or more monomers copolymerizable therewith, such as vinyl aromatic compound. Examples of suitable vinyl aromatic monomers that may be used include styrene, 3-methyl styrene, vinyl toluene, ethyl styrene, 3,5-diethyl styrene, 4-n-propylstyrene, α-methyl-styrene, α-methyl vinyltoluene, α-chlorostyrene, α-bromostyrene, dichlorostyrene, dibromostyrene, tetrachlorostyrene, p-cyclohexyl styrene, vinyl naphthalene, 1-vinyl naphthalene, 2-vinyl naphthalene, methoxystyrene, t-butoxystyrene, vinyl ethyl naphthalene, vinyl methyl naphthalene, vinyl butyl naphthalene, vinyl diphenyl, vinyl diphenylethane, 4-vinyl-4'-methyldiphenyl, and the like, and combinations comprising at least one of the foregoing compounds. Styrene and/or α-methylstyrene may be used as monomers copolymerizable with the conjugated diene monomer.

Where such comonomers are to be used, generally at least 1.0% and no more than 70% of the comonomer may be used. Preferably, for at least some applications, no more than 30-40% of the comonomer may be used.

Carboxylate terminated elastomers comprised of polymers and copolymers of conjugated dienes such as polybutadiene, polyisoprene, and styrene-butadiene rubbers are particularly well-suited for the applications discussed herein.

Unless otherwise specified, all molecular weights are weight average molecular weights, abbreviated as "Mw." Number average molecular weights are abbreviated as "Mn." Molecular weights may be determined by Gel Permeation Chromatography (GPC), alternatively known as Size Exclusion Chromatography (SEC). (Molecular weights expressed in this document were corrected for polybutadiene using appropriate Mark-Houwink constants versus the polystyrene standards.) For a given carboxylate terminated elastomer, the molecular weight should be well controlled so that undesired material properties may be avoided. For example, as known to those of skill in the art polydienes such as polybutadienes with too low Mw are very sticky and difficult to handle and process at ambient temperatures. The Mw of the carboxylate terminated elastomer in the invention may generally range from about 80,000 to about 350,000, preferably from about 100,000 to about 300,000, and more preferably from about 140,000 to about 200,000.

Solution viscosity of example elastomers can be optimized to suit particular applications. As mentioned above, a low solution viscosity rubber provides benefits such as facilitating the dispersion of the rubber in the plastic phase and improving the clarity and the gloss of the resultant product in impact-modified plastic compositions.

In embodiments, the solution viscosity of the carboxylate terminated elastomer before addition of the ionolizer may generally range from about 75 cP to about 300 cP, preferably from about 80 cP to about 250 cP, and more preferably from about 90 cP to about 170 cP. Solution viscosity can be measured in various ways. The solution viscosity numbers discussed herein were measured using a 5.43% toluene solution at 25° C.

In the technology described herein, an ionolizer is used cooperatively with the carboxylate terminated elastomer to decrease the solution viscosity of the elastomer. Example ionolizers include: organic acid/salts such as zinc stearate, zinc oxide, aluminum stearate (mono, di or tristrearate), and/or 2-ethylhexanoic acid (EHA). The ionolizer may be added to the elastomer before or after the elastomer is mixed with an impact-modified plastic. However, adding the elastomer before phase inversion occurs allows better dispersion of the ionolizer. The ionolizer may be dissolved with the carboxylate terminated rubber in styrene monomer for HIPS production. The different additives may result in different rubber particle size and morphology in the HIPS product. The weight ratio of such ionolizer to the carboxylate terminated elastomer may generally range from about 0.1% to about 10%, preferably from about 0.2% to about 5%, and more preferably from about 0.25% to about 3%.

With the addition of the ionolizer, a carboxylate terminated elastomer will have a decreased solution viscosity generally ranging from about 0.4 times the solution viscosity of the elastomer before the Ionolizer was added to about 0.58 times the solution viscosity of the elastomer before the ionolizer was added. Preferably the carboxylate terminated elastomer has a decreased solution viscosity generally ranging from about 0.45 times the solution viscosity of the elastomer before the ionolizer was added to about 0.55 times the solution viscosity of the elastomer before the ionolizer was added. When these factors are taken together with the example pre-ionolizer addition viscosities listed above it yields final solution viscosities in the ranges of about 30 cP to about 174 cP, and preferably, in some applications, from about 43 cP to about 120 cP.

In an embodiment, the carboxylate terminated elastomer is a material with relatively high Mooney viscosity capable of being baled into a shippable and easy to handle form. Mooney viscosity is measured according to ASTM D-1646. $ML_{1+4}$ refers to the Mooney viscosity at 100° C. Unless otherwise specified, Mooney viscosity as referred to herein is $ML_{1+4}$. The Mooney viscosity of carboxy terminated elastomers may generally range from about 35 to about 75, and preferably from about 45 to about 65.

In an example, the carboxylate terminated elastomer such as carboxylate terminated polybutadiene is used as an additive in an impact-modified plastic composition (resin) such as HIPS, ABS, SMA, and TIPS. Based on the total weight of the plastic composition, the carboxylate terminated elastomer may have a loading of from about 5% to about 30%, preferably from about 5% to about 25%, and more preferably from about 6% to about 20%.

The carboxylate terminated elastomer exists as substantially discrete particles dispersed in the plastic matrix. The size of the elastomer particles may generally range from about 0.1 microns to about 10 microns, and for at least some applications, preferably from about 0.2 microns to about 3.0 microns. The particle size may be measured using transition electron microscopy (TEM).

In one example of the technology described herein, a continuous diblock polymer with carboxylate termination could be prepared and used in HIPS or ABS. Examples of such continuous diblock polymer include, but are not limited to, copolymers including vinyl aromatic hydrocarbons and alkenes. More specific examples include: styrene-butadiene copolymers, such as copolymers containing 10% bound styrene, styrene-isoprene copolymer, or styrene-isoprene-butadiene copolymer. The use of a comonomer will broaden the solution viscosity range while still allowing the polymer to be baleable.

A continuous polybutadiene terminated with carboxylate results in partial coupling and partial carboxylate functionality. In other words, the "carboxylate functionalized" or "carboxylate terminated" polymer has only partial functionality. It also contains some covalent coupling.

One method of making an impact-modified plastic composition with a carboxylate terminated polymer generally includes: (i) providing a living elastomer by anionic polymerization; (ii) terminating the living elastomer with carboxylate; and (iii) incorporating the carboxylate terminated elastomer into a plastic composition.

The carboxylate terminated elastomer may be polymerized by mass, emulsion, suspension, solution or combined processes such as bulk-suspension, emulsion-bulk, bulk-solution or other techniques, using continuous, semibatch, or batch processes.

The monomer for the anionic polymerization may be selected from those conjugated diene monomers, vinyl aromatic monomers, and other monomers, as described above.

Any suitable anionic initiator may be used in the preparation of the carboxylate terminated elastomer. Examples of anionic initiators include organometallic compounds of the alkali metals. Other suitable anionic initiators include activated organometallic compounds of the Group II metals. For example, dialkyl magnesium activated with a group I metal alkoxide.

In one example method, the anionic initiators are organolithium compounds. Organolithium initiators are known to produce living polymerization reactions. As known to those of skill in the art, living polymerizations are useful for adding end groups and creating defined blocks of monomers in the polymer chain. Suitable lithium initiators include, but are not limited to, n-butyllithium, sec-butyllithium, tert-butyllithium, 1,4-dilithiobutane, 1,3-(di-2-(2-lithio-4-methyl)pentenyl)benzene, and any mixture thereof.

An anionic initiator is employed in an amount that is designed to result in the desired molecular weight of the carboxylate terminated elastomer.

A high vinyl content in the carboxylate terminated conjugated diene homo- or co-polymers might be desired. If desired, the anionic polymerization of the invention may be conducted in the presence of a modifier or a 1,2-microstructure controlling agent, so as to, for example, increase the reaction rate, equalize the reactivity ratio of monomers, and/or control the 1,2-vinyl content or the 1,2-microstructure in the conjugated diene units. Suitable example modifiers include, but are not limited to, triethylamine, tri-n-butylamine, hexamethylphosphoric acid triamide, N,N,N',N'-tetramethylethylene diamine, ethylene glycol dimethyl ether, diethylene glycol dimethyl ether, triethylene glycol dimethyl ether, tetraethylene olycol dimethyl ether, tetrahydrofuran, 1,4-diazabicyclo[2.2.2]octane, diethyl ether, tri-n-butylphosphine, p-dioxane, 1,2 dimethoxy ethane, dimethyl ether, methyl ethyl ether, ethyl propyl ether, di-n-propyl ether, di-n-octyl ether, anisole, dibenzyl ether, diphenyl ether, dimethylethylamine, bix-oxalanyl propane, tri-n-propyl amine, trimethyl amine, triethyl amine, N,N-dimethyl aniline, N-ethylpiperidine, N-methyl-N-ethyl aniline, N-methylmorpholine, tetramethylenediamine, oligomeric oxolanyl propanes (OOPs), 2,2-bis-(4-methyl dioxane), bistetrahydrofuryl propane, bis(2-oxolanyl)methane; 1,1-bis(2-oxolanyl)

ethane; 2,2-bis(2-oxolanyl)propane; 2,2-bis(5-methyl-2-oxolanyl)propane; 2,2-bis-(3,4,5-trimethyl-2-oxolanyl)propane; 2,5-bis(2-oxolanyl-2-propyl)oxolane; octamethylperhydrocyclotetrafurfurylene (cyclic tetramer); 2,2-bis(2-oxolanyl)butane; and the like. A mixture of two or more modifiers or 1,2-microstructure controlling agents also can be used.

Suitable polymerizations can be conducted in autoclaves, pressurized reactors or bottles capable of withstanding the pressures generated at the temperature used. Preferably, the pressure will be in a range of about 34-760 kPa. Temperatures are preferably between about room temperature to about 120° C. The duration of the example anionic polymerization is not particularly limited, and may last as long as necessary until the reaction is completed and a desired degree of polymerization is obtained.

When polymerization is completed to the desired degree, $CO_2$ may be added to the reaction system. The $CO_2$ terminates the living polymer chains, resulting in carboxlyate end groups on most of the polymer chains. The $CO_2$ may be added to the polymerization mixture by bubbling through in a gaseous form. The $CO_2$ reacts with the reactive end groups of the living polymer chains to effectively end the living polymerization. The resulting example polymer has carboxylate end groups which are stabilized by the Li+ initiator residues present in the polymerization mixture along with an amount of covalently coupled polymer chains.

A small amount of antioxidant, such as di-t-butyl cresol may be added to the polymer product. The antioxidant is preferably added in an amount less than 4 weight percent, more preferably less than 2 weight percent of the total solution. The polymer can be recovered and dried before processing, preferably by drum drying at an appropriate temperature for evaporation of remaining solvent. Alternatively, a steam desolventization method is used to recover the polymer product.

In one example of an elastomer/plastic mixing stage, the carboxylate terminated elastomer is incorporated into a plastic composition. The plastic composition can be prepared by dissolving the carboxylate terminated elastomer in a solution containing vinyl aromatic monomer such as styrene, and polymerizing the elastomer/monomer mixture. This process can be conducted using conventional techniques known in the art for preparing rubber reinforced polymers such as HIPS and ABS, which are described in U.S. Pat. Nos. 2,646,418, 4,311,819, 4,409,369, and 5,721,320. For example, HIPS can be manufactured by polymerization of styrene in the presence of 5-40% dissolved carboxylate terminated elastomer, preferably 6-20% carboxylate terminated polymer rubber. Early in the polymerization, phase separation begins because of the immiscibility of the rubber within the polystyrene being formed and the depletion of the styrene phase Grafting of polybutadiene with the polystyrene may also take place.

The example elastomer/plastic mixing stage may be accomplished during a free radical polymerization, which may be performed in batch cell, bulk continuous, suspension, solution, or emulsion. For example, ABS copolymers can be produced using polymerization processes such as bulk-suspension, continuous bulk, and emulsion.

In one example, the carboxylate terminated rubber is blended with a polymerized vinyl aromatic monomer. In another example, the vinyl aromatic monomer is polymerized in the presence of the carboxylate terminated rubber. In the latter method, the vinyl aromatic monomer is partially graft polymerized onto the rubber. A free radical initiator may be used to start the preparation of the plastic composition.

For HIPS application, the technology disclosed herein provides an improvement over typical HIPS polymers in that the reduced solution viscosity after the addition of an ionizer results in reduced particle size and improved dispersion between the polydiene and vinyl aromatic domains. This leads to improved physical and optical properties.

The examples disclosed herein may be used for the efficient and economical manufacture of HIPS, which is widely used in many applications such as refrigerator linings, packaging, furniture, household appliances and toys, because of their ease of molding, good gloss, and generally good mechanical properties. HIPS are mainly produced by continuous polymerization processes but can also be produced by batch processes.

One example of a continuous process for making HIPS consists of polymerizing styrene monomer in the presence of dissolved rubber. Polystyrene is initially formed from the styrene monomer within the homogeneous rubber solution. The rubber types usually utilized in the manufacture of HIPS include polybutadiene (PB), styrene-butadiene rubber (SBR), and styrene-butadiene-styrene rubber (SBS). The processes may utilize two continuous-stirred tank reactors (CSTR) in the initial manufacturing process to control grafting of the elastomer and styrene particles as well as controlling the rubber particle size (RPS) of the material. In the process, one of the CSTR may function as a pre-inversion reactor (PIR), where the reacting solution is maintained at a point prior to the rubber/styrene inversion point, i.e., the point at which the solution being reacted goes from polystyrene particles in a rubber/styrene monomer matrix to rubber particles in a polystyrene matrix. The inversion point may be achieved in the second CSTR vessel.

Articles made from the disclosed example plastic compositions exhibit improved mechanical properties such as impact resistance. Generally, the Izod impact strength of such article may range from about 0.5 or greater, preferably greater than 1.5, for certain applications Izod values of from about 1.5 to about 4.0 are preferred; however because Izod strength is inversely correlated to gloss properties lower Izod strengths may be preferred for some applications where gloss is important, for example from 1.0 to 2.5. The Izod strength may be measured using ASTM method D-256-06.

Other mechanical and rheological properties of impact-modified plastic compositions such as HIPS are affected by the nature of the rubber phase. In this regard, some of the characteristics of the rubber which may be modified to control the overall HIPS performance include the concentration of rubber particles dispersed within the HIPS resin, grafting and cross-linking ability, rubber morphology such as rubber particle shape and size, rubber particle size distribution (RPSD), swell index, and the rubber phase volume, as measured by the ratio of the % gel to % plastic, among others. For example, the ionolizer additive can be used to control the rubber particle size in impact-modified plastics. Modifying the rubber particle size allows control of the Izod strength and gloss of the impact-modified plastic.

The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner.

EXAMPLES

I. Elastomer Synthesis

A. Example Elastomers A-D (Carboxylate Terminated Elastomers)

Example Elastomer A

Two 50 gallon reactors were utilized. The first reactor was charged with hexane and a reactor jacket was used to heat the reactor to 210° F. Then hexane (feed rate 51.99 lbs/hr), 1,3-butadiene (22% in hexane) (feed rate 227.27 lbs/hour), oligomerie oxalanyl propane (OOPs) (0.020 lbs/hr, 15% in hexane by syringe pump), and gel suppressant (1,2-butadiene, 5% in hexane) (feed rate 0.125 lbs/hr) were continuously charged into the first reactor. A second feed of hexane (feed rate 33.24 lbs/hr) with a feed of n-butyllithium (2.2 lbs/hr, 3% in hexane) was charged to the reactor. As the reaction progressed, the jacket temperature was lowered to 175° F. to keep the top of the reactor at a maximum temperature of about 200° F. Residence time in the reactor was about 51 minutes. Polybutadiene product was transferred from the top of the first reactor and fed into the second reactor. This yielded a base Mn of 48,000. Mn measured after coupling was increased as reported in Table 1. $CO_2$ was added to the second reactor at a rate of about 0.2 lbs/hour to couple and terminate the polybutadiene and yield the carboxylate terminated elastomer. Residence time in the second reactor was also about 51 minutes.

Example Elastomer B

The same process as described in Example A was followed for Example B, except the feed rate of n-butyllithium was 2.0 lbs/hr in the first feed. The $CO_2$ feed rate was the same as in Example A. This yielded a polymer with a base Mn of about 51,600.

Example Elastomer C

The same process as described in Example A was followed for Example C, except the feed rate of n-butyllithium was 1.8 lbs/hr in the first feed, and the $CO_2$ feed rate was about 0.1 lbs/hr. This yielded a polymer with a base Mn of about 60,400.

Example Elastomer D

The same process as described in Example A was followed for Example D, except the feed rate of n-butyllithium was 1.5 lbs/hr in the first feed, and the $CO_2$ feed rate was about 0.1 lbs/hr. This yielded a polymer with a base Mn of about 70,000.

Table 1 lists the properties of the synthesized carboxylated polymers.

B. Elastomer Synthesis for Comparative Examples A-B (Non-Carboxylate Terminated Elastomers)

Comparative Example A

For the non-carboxylate terminated polybutadiene for Comparative Example A a commercially available polybutadiene sold by Firestone Polymers (Akron, Ohio) under the trade name Diene™ 55 was utilized. (Two varieties of Diene 55 are available, AC-10 and AC-15, and these may be used interchangeably for the purposes of these examples.) The properties of Diene™ 55 are listed in Table 1, above.

Comparative Example B

A non-carboxylate terminated polybutadiene was prepared according to the process described for Example Elastomer A, except dioctyl teraphthalate was added in place of $CO_2$ at a rate of 27.71 ml/hr.

The properties of the resulting non-carboxylate terminated polybutadiene are listed in Table 1, above.

II. Preparing Blends with Impact-Modified Plastics (Examples 1-28)

Utilizing the carboxylate terminated elastomers previously prepared (Examples A-D) and the non-carboxylate terminated elastomers discussed above (Comparative Examples A and B), various blends of the elastomers with an impact-modified plastic were prepared, Table 2 lists the various combinations of elastomer and ionilizer used in the examples. For purposes of these examples, the impact-modified plastic prepared was HIPS. These examples should not be interpreted in any way to limit the disclosure or the claims to the use of HIPS as the impact-modified plastic. Various other impact-modified plastics are well known and procedures for preparing blends with the carboxylate terminated elastomers disclosed herein are within the knowledge of those of skill in the art.

TABLE 2

Elastomers and Ionilizers Utilized

| Example # | Elastomer | Ionilizer | Amount of Ionilizer |
|---|---|---|---|
| Comparative 1 | Comparative Example A | None | None |
| Comparative 2 | Comparative Example A | None | None |
| Comparative 3 | Comparative Example A | None | None |
| Comparative 4 | Comparative Example B | None | None |

TABLE 1

Properties of Elastomers

| Elastomer | $ML_{1+4}$ | SV | $M_n$ | $M_w$ | cis (%) | trans (%) | vinyl (%) | Mp |
|---|---|---|---|---|---|---|---|---|
| Example A | 45.9 | 74.0 | 82,126 | 141,691 | 38.8 | 52.0 | 9.1 | 130,171 |
| Example B | 48.8 | 96.7 | 82,604 | 151,893 | 37.9 | 51.6 | 10.5 | 133,696 |
| Example C | 49.6 | 124.9 | 93,147 | 190,418 | 39.7 | 50.1 | 10.3 | 153,930 |
| Example D | 63.7 | 166.9 | 103,539 | 189,283 | 39.3 | 51.7 | 9.0 | 182,631 |
| Comparative Example A | 53 | 162 | 113,862 | 222,571 | 40 | 50 | 10 | 192,819 |
| Comparative Example B | 58.1 | 89.1 | 110,005 | 213,929 | 38 | 51.4 | 10.6 | 193,446 |

TABLE 2-continued

Elastomers and Ionilizers Utilized

| Example # | Elastomer | Ionilizer | Amount of Ionilizer |
|---|---|---|---|
| Comparative 5 | Comparative Example B | None | None |
| HIPS 1* | Example A | None | None |
| HIPS 2 | Example A | EHA | 0.5 Ml |
| HIPS 3 | Example A | Zinc stearate | 1.28 grams |
| HIPS 4 | Example A | Zinc stearate + zinc oxide | 1.0 grams, 0.28 grams |
| HIPS 5* | Example B | None | None |
| HIPS 6 | Example B | EHA | 0.5 mL |
| HIPS 7 | Example B | Zinc stearate | 1.28 grams |
| HIPS 8 | Example B | Zinc stearate + zinc oxide | 1.0 grams, 0.28 grams |
| HIPS 9* | Example C | None | None |
| HIPS 10 | Example C | EHA | 0.5 mL |
| HIPS 11 | Example C | Zinc stearate | 1.28 grams |
| HIPS 12 | Example C | Zinc stearate + zinc oxide | 1.0 grams, 0.28 grams |
| HIPS 13* | Example D | None | None |
| HIPS 14 | Example D | EHA | 0.4 mL |
| HIPS 15 | Example D | EHA | 0.4 mL |
| HIPS 16 | Example D | Zinc stearate + zinc oxide | 1.0 grams, 0.3 grams |
| HIPS 17 | Example D | Zinc stearate + zinc oxide | 1.0 grams, 0.3 grams |
| HIPS 18 | Example D | Zinc stearate + zinc oxide | 1.0 grams, 0.3 grams |
| HIPS 19 | Example D | EHA | 0.8 mL |
| HIPS 20 | Example D | EHA | 1.8 mL |
| HIPS 21 | Example D | EHA | 4.0 mL |
| HIPS 22 | Example D | Liquid polybutadiene | 4 mL |
| HIPS 23 | Example D | Liquid polybutadiene | 2 mL |
| HIPS 24 | Example D | Maleic anhydride functionalized liquid polybutadiene | 2 mL |
| HIPS 25 | Example D | Maleic anhydride functionalized liquid polybutadiene | 4 mL |
| HIPS 26* | Example D | None | None |
| HIPS 27 | Example D | EHA | 0.6 mL |
| HIPS 28 | Example D | EHA | 1.2 mL |
| HIPS 29 | Example B | AlSt2 (aluminum stearate) | 1.2 g |
| HIPS 30 | Example B | AlSt3 | 2.0 g |
| HIPS 31 | Example B | AlSt | 0.7 g |

*HIPS examples 1, 5, 9, 13, and 26 are comparative in that they contain carboxylate-terminated elastomers, but do not contain an ionilizer.

The example HIPS blends were prepared according to the following recipe:

- 48 to 64 grams elastomer (rubber)
- 736 to 752 grams styrene (solvent)
- 141.2 grams ethyl benzene (additional solvent)
- 20 grams mineral oil
- 8.4 grams I-1076 (Irganox 1076 antioxidant, CIBA)—added in 10% hexane solution
- 0.15 grams tertbutylbenzoate (initiator)

Thus, the total solution amount for a typical batch was 800 grams (styrene+elastomer combined). Some examples contained more or less rubber. This yielded a rubber concentration in solution of approximately or 7 to 20%. The desired rubber concentration in HIPS was 8-10%. The expected final conversion of styrene was expected to be approximately 70%, but as reported below, in the "Styrene Conversion" column of Table 4, varied from example to example.

In order to prepare the HIPS blends, a 1.5 liter jacketed glass reactor with a helical agitator was utilized. The agitator had maximum rpm of 180.

In general, in order to prepare the compositions, the specified amount of polybutadiene was dissolved in styrene and charged to the reactor. Then ethyl benzene and additional ingredients including mineral oil, antioxidant, initiator and ionilizer (when applicable) were also charged. The jacket was set to 100° C. when the components were charged into the reactor. After the components were charged, the agitator was turned on (set to 180 rpm). To keep the reaction rate approximately constant, the jacket temperature was increased from 102° C. to 160° C. during the course of the polymerization and the agitator rpm was reduced during the course of the polymerization (from an initial setting of 180 rpm down to 30 rpm). The total reaction time (in the reactor) was 6.5 hours. Varying amounts of HIPS compositions were produced. The HIPS composition was dried in a vacuum oven at a temperature of 240° C. for 45 minutes to devolatize the residual solvents and monomer and to allow crosslinking of the rubber to occur. An example detailed set of reaction conditions generally applicable to each of Examples 1-28 are provided below in Table 3. Some variation in the listed parameters occurred between examples.

TABLE 3

Process Parameters - Preparation of HIPS Compositions

| Time (minutes) | Jacket temperature ° C. | Reactor temperature ° C. | Reactor pressure (inches Hg) | Reactor rpm |
|---|---|---|---|---|
| 00:00 | 102.0 | 52 | −10 | 180 |
| 00:30 | 122.0 | 85 | 5.8 | 180 |
| 01:00 | 110.0 | 107 | 5.2 | 180 |
| 02:00 | 114 | 105 | 4.0 | 180 |
| 03:00 | 123 | 114 | 3.0 | 120 |
| 04:00 | 129 | 122 | 2.5 | 60 |
| 05:00 | 140 | 131 | 2.2 | 30 |
| 06:00 | 145 | 141 | 3.2 | 30 |
| 06:30 | 145 | 141 | 3.0 | 30 |

Amount of HIPS recovered: 404 grams (pan 1), 47 grams (pan 2)

III. Analysis of HIPS Compositions (Examples 1-28)

The various HIPS compositions (Examples 1-28) were analyzed to determine their properties. Results are reported below in Tables 4-1 and 4-2.

The examples were injection molded in a Battenfeld injection molding machine for testing. Tensile strength was measured on an instrument made by Instron. Izod strength was tested by an Izod impact testing machine. Styrene conversion is expressed as a weight percentage of total styrene. Rubber content, and polydiene content are expressed as weight percentages of the weight of the HIPS example.

Gel and swell values were determined by immersing the examples in toluene for two hours at 60° C., pouring off the excess toluene, and then centrifuging to separate the insoluble rubber portion. The weight of the swollen rubber particles was measured. Then the sample was dried in a vacuum oven at 210° C., and the weight of the dry rubber particles was measured. Using the dry rubber particle weight, the HIPS weight, and the swollen rubber weight, the gel and swell values were obtained.

TABLE 4-1

| Example # | Styrene Conversion | Polydiene Content | Melt Index | Tensile Yield, PSI |
|---|---|---|---|---|
| Comparative HIPS 1 | 60 | 10.1 | 1.5 | 2946 |
| Comparative HIPS 2 | 52 | 11.7 | 2.5 | 3326 |
| Comparative HIPS 3 | 61 | 9.8 | 2.7 | 2971 |
| Comparative HIPS 4 | 60 | 10.0 | 2.2 | 3744 |
| Comparative HIPS 5 | 62 | 7.9 | 2.0 | 3975 |
| HIPS 1 | 56% | 10.6% | 2.5 | 3727 |
| HIPS 2 | 57% | 10.6% | 2.4 | 3856 |
| HIPS 3 | 65% | 9.3% | 2.1 | 4247 |
| HIPS 4 | 64% | 9.3% | 1.7 | 4638 |
| HIPS 5 | 54% | 10.3% | 2.0 | 4391 |
| HIPS 6 | 55% | 11.0% | 2.0 | 3953 |
| HIPS 7 | 67% | 8.9% | 2.1 | 4701 |
| HIPS 8 | 69% | 8.8% | 1.5 | 4938 |
| HIPS 9 | 67% | 9.0% | 2.3 | 5131 |
| HIPS 10 | 73% | 8.2% | 2.7 | 5493 |
| HIPS 11 | 74% | 8.2% | 2.4 | 5479 |
| HIPS 12 | 79% | 7.6% | 1.2 | 5858 |
| HIPS 13 | 59% | 10.2% | 2.4 | 3792 |
| HIPS 14 | 64% | 9.4% | 2.7 | 4020 |
| HIPS 15 | 66% | 9.1% | 3.9 | 3899 |
| HIPS 16 | 66% | 9.1% | 2.1 | 3774 |
| HIPS 17 | 67% | 9.0% | 2.6 | 3818 |
| HIPS 18 | 71% | 8.4% | 2.0 | 4346 |
| HIPS 19 | 63.5% | 9.4% | 3.1 | 4680 |
| HIPS 20 | 59.5% | 10.1% | 3.3 | 4460 |
| HIPS 21 | 63.5% | 9.4% | 3.3 | 4531 |
| HIPS 22 | 53% | 11.2% | 2.0 | 2946 |
| HIPS 23 | 53% | 11.3% | 2.9 | 3110 |
| HIPS 24 | 60% | 10.0% | 2.3 | 3650 |
| HIPS 25 | 61% | 9.8% | 2.3 | 3810 |
| HIPS 26 | 44% | 13.6% | 2.6 | 2635 |
| HIPS 27 | 46% | 13.0% | 15 | 3168 |
| HIPS 28 | 51% | 11.8% | 2.1 | 3567 |
| HIPS 29 | 85% | 7.1% | 5.8 | 4515 |
| HIPS 30 | 78% | 7.7% | 7.6 | 4286 |
| HIPS 31 | 73% | 8.2% | 6.2 | 4261 |

TABLE 4-2

| Example # | Elongation | Izod | Gel | Swell | Gloss (60 Degree) |
|---|---|---|---|---|---|
| Comparative HIPS 1 | 85 | 3.2 | 17.5 | 17.4 | 12.6 |
| Comparative HIPS 2 | 38 | 3.9 | 18.6 | 14.0 | 38.3 |
| Comparative HIPS 3 | 77 | 3.0 | 23.2 | 12.8 | 25.0 |
| Comparative HIPS 4 | 44 | 3.7 | 15.5 | 13.7 | 44.5 |
| Comparative HIPS 5 | 34 | 3.2 | 18.6 | 11.6 | 51.3 |
| HIPS 1 | 37 | 3.3 | 23.4 | 12.1 | 29.8 |
| HIPS 2 | 33 | 3.3 | 24.5 | 12.0 | 36.1 |
| HIPS 3 | 24 | 1.9 | 11.5 | 13.1 | 44.5 |
| HIPS 4 | 27 | 1.7 | 19.1 | 12.1 | 25 |
| HIPS 5 | 36 | 2.7 | 28.0 | 11.6 | 24.4 |
| HIPS 6 | 35 | 3.0 | 25.8 | 11.4 | 35.1 |
| HIPS 7 | 32 | 1.6 | 15.7 | 13.0 | 29.2 |
| HIPS 8 | 20 | 0.65 | 16.7 | 12.5 | 37.2 |
| HIPS 9 | 22 | 0.96 | 17.1 | 12.3 | 40.3 |
| HIPS 10 | 16 | 0.61 | 12.3 | 14.3 | 64.9 |
| HIPS 11 | 20 | 0.80 | 10.9 | 16.3 | 53.3 |
| HIPS 12 | 14 | 0.50 | 29.0 | 15.8 | 35.1 |
| HIPS 13 | 14 | 2.8 | 26.1 | 11.0 | 28.5 |
| HIPS 14 | 21 | 2.5 | 23.2 | 10.1 | 44.3 |
| HIPS 15 | 24 | 2.3 | 22.8 | 11.0 | 38.9 |
| HIPS 16 | 20 | 2.3 | 25.2 | 12.0 | 25.3 |
| HIPS 17 | 21 | 2.6 | 24.7 | 11.6 | 29.0 |
| HIPS 18 | 20 | 1.9 | 25.3 | 12.7 | 33.5 |
| HIPS 19 | 23 | 1.5 | 10.9 | 18.6 | 68.2 |
| HIPS 20 | 15 | 0.72 | 12.4 | 12.0 | 83.3 |
| HIPS 21 | 16 | 0.78 | 12.1 | 11.8 | 86.5 |
| HIPS 22 | 16 | 3.8 | 26.9 | 12.0 | 31.8 |
| HIPS 23 | 20 | 3.2 | 30.5 | 10.6 | 58.2 |
| HIPS 24 | 13 | 3.3 | 17.9 | 13.1 | 59.5 |
| HIPS 25 | 10 | 3.1 | 22.7 | 12.4 | 41.3 |
| HIPS 26 | 16 | 3.6 | 33.7 | 10.5 | 40.4 |
| HIPS 27 | 15 | 4.0 | 27.4 | 10.7 | 48.6 |
| HIPS 28 | 11 | 3.7 | 16.9 | 7.9 | 41.5 |
| HIPS 29 | 18 | 0.99 | 22.5 | 10.2 | 74.4 |
| HIPS 30 | 18 | 1.0 | 24.0 | 10.1 | 80.9 |
| HIPS 31 | 14 | 1.2 | 24.2 | 10.1 | 78.3 |

As the results in Tables 4-1 and 4-2 indicate, the HIPS examples with carboxylate terminated polymers and ionolizer additives show good Izod strength like the comparative examples. The ionolizer additive provides a way to decrease solution viscosity of the rubber compound while also having a high Izod strength when the rubber is added to an impact-modified plastic.

The ionolizer additive also allows control of the particle sizes in the impact-modified plastic. A large particle size improves the Izod strength, and a small particle size achieves better gloss properties. Accordingly, the ionolizer additive can be used to control the balance of strength and gloss properties in an impact-modified plastic. For example, HIPS examples 20 and 21 displayed a good balance of Izod strength and high gloss (above 80). Examples 19, 23, and 24 showed fairly high gloss (around 60), and a high Izod strength.

What is claimed is:

1. A composition comprising:
a baleable polymer resulting from the polymerization of at least one conjugated diene in the presence of an anionic initiator;
wherein said polymer has carboxylate termination resulting from the addition of carbon dioxide to terminate polymerization;
wherein said polymer has Mooney $ML_{1+4}$ viscosity at 100° C. of >35 and a solution viscosity at 25° C. of X, where X is >75 cP; and
wherein the addition of an ionolizer to a composition comprising the polymer reduces the solution viscosity at 25° C. of the polymer from X to Y where Y meets the following formula:

$$0.4X \leq Y \leq 0.58X.$$

2. The composition as claimed in claim 1 wherein said carbon dioxide and said initiator are used in a ratio of more than 0.5:1.0.

3. The composition as claimed in claim 1 where Y meets the following formula:

$$0.45X \leq Y \leq 0.55X.$$

4. The composition as claimed in claim 1 where said polymer has a Mooney $ML_{1+4}$ viscosity of >45.

5. The composition as claimed in claim 1 wherein X is >90 cP.

6. The composition as claimed in claim 1 comprising a mixture of a first polymer having the formula (I):

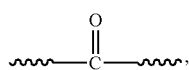

of a second polymer having the (II)

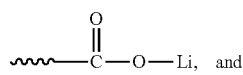

of a third polymer having the formula (III)

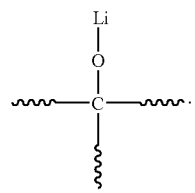

7. The composition as claimed in claim 1 wherein said ionolizer is organic acid salt.

8. The composition as claimed in claim 1 wherein said ionolizer is selected from the group consisting of zinc stearate, zinc oxide, aluminum stearate, and mixtures thereof.

9. The composition as claimed in claim 1 wherein said ionolizer is selected from the group consisting of liquid polybutadiene and maleic anhydride functionalized liquid polybutadiene, or mixtures thereof.

10. The composition as claimed in claim 1 wherein said conjugated diene is selected from the group consisting of 1,3-butadiene, isoprene, 2,3-dimethyl-1,3-butadiene, 1,3-pentadiene, and mixtures thereof.

11. The composition as claimed in claim 1 further comprising at least one additional monomer copolymerized with said at least one conjugated diene where said additional monomer is selected from the group consisting of vinyl aromatic hydrocarbons, alkenes, and mixtures thereof.

12. The composition as claimed in claim 1 in combination with high impact polystyrene (HIPS), styrene-maleic anhydride copolymer, methylmethacrylate-butadiene-styrene copolymer, transparent impact polystyrene, or acrylonitrile styrene butadiene copolymer.

13. The composition as claimed in claim 1 wherein a polar compound is added to said carboxylate terminated polymer.

14. The composition as claimed in claim 1 wherein said polymer has a weight average molecular weight of from about 80,000 to about 350,000.

15. The composition as claimed in claim 1 wherein said polymer has a weight average molecular weight of from about 140,000 to about 200,000.

16. The composition as claimed in claim 1 wherein a vinyl modifier is used during the polymerization to increase the vinyl content of the conjugated diene units in said carboxylate terminated polymer.

17. The composition as claimed in claim 16 wherein the vinyl modifier is selected from the group consisting of hexamethylphosphoric acid triamide, N,N,N',N'-tetramethylethylene diamine, ethylene glycol dimethyl ether, diethylene glycol dimethyl ether, triethylene glycol dimethyl ether, tetraethylene glycol dimethyl ether, tetrahydrofuran, 1,4-diazabicyclo[2.2.2]octane, diethyl ether, triethylamine, tri-n-butylamine, tri-n-butylphosphine, p-dioxane, 1,2-dimethoxyethane, dimethyl ether, methyl ethyl ether, ethyl propyl ether, di-n-propyl ether, di-n-octyl ether, anisole, dibenzyl ether, diphenyl ether, dimethylethylamine, bis-oxalanyl propane, tri-n-propyl amine, trimethyl amine, triethyl amine, N,N-dimethyl aniline, N-ethylpiperidine, N-methyl-N-ethyl aniline, and N-methylmorpholine and mixtures thereof.

18. The composition as claimed in claim 1 wherein said initiator is an organolithium initiator.

19. A composition as claimed in claim 1 wherein the at least one conjugated diene is copolymerized with at least one additional monomer including vinyl aromatic hydrocarbons and alkenes.

20. The composition as claimed in claim 19 wherein the vinyl aromatic hydrocarbons are selected from the group consisting of styrene, 3-methylstyrene, vinyl toluene, ethyl styrene, vinyl naphthalene, vinyl ethylnapthalene, vinyl methyl naphthalene, vinyl butyl naphthalene, vinyl diphenyl, vinyl diphenylethane, and 4-vinyl-4'-methyldiphenyl and mixtures thereof.

21. The composition as claimed in claim 1 wherein the weight of the added ionolizer is 0.1% to 30% of the weight of the polymer.

22. A process for utilizing the composition as claimed in claim 1 to prepare a blend of the polymer composition and an impact-modified plastic comprising the steps of:
 a. dissolving the baleable carboxylate terminated polymer in a solvent comprising at least one vinyl aromatic compound;
 b. optionally adding at least one additional comonomer;
 c. adding at least one Ionolizer to reduce the solution viscosity at 25° C. of said polymer from X to Y where Y meets the following formula: $0.4X \leq Y \leq 0.58X$;
 d. optionally adding at least one additional inert solvent;
 e. optionally adding additives selected from the group consisting of extender oils, modifiers, and antioxidants;
 f. initiating polymerization of the at least one vinyl aromatic compound by the use of an initiator and heat during which phase inversion occurs;
  wherein steps a, b, c, d and e can be performed in any order; and
  wherein the impact-modified plastic is selected from the group consisting of high impact polystyrene, styrene-maleic anhydride copolymer, methylmethacrylate-butadiene-styrene copolymer, transparent impact polystyrene, and acrylonitrile butadiene styrene copolymer.

23. The process as claimed in claim 22 wherein step c is performed before phase inversion occurs.

24. The process as claimed in claim 22 wherein said ionolizer is an organic acid salt.

25. The process as claimed in claim 22 wherein said ionolizer is selected from the group consisting of zinc stearate, zinc oxide, aluminum stearate, and mixtures thereof.

26. The composition as claimed in claim 22 wherein said ionolizer is selected from the group consisting of liquid polybutadiene and maleic anhydride functionalized liquid polybutadiene, or mixtures thereof.

27. The process as claimed in claim 22 wherein said initiator in step f is tertbutylperbenzoate.

28. A composition comprising:
 a. a baleable polymer with carboxylate termination;
  wherein said polymer has Mooney $ML_{1+4}$ viscosity of >35 and a solution viscosity at 25° C. of X, where X is >75 cP; and wherein the addition of an ionizer reduces the solution viscosity at 25° C. from X to Y where Y meets the following formula: 0.4X≤Y≤0.58X;
wherein said polymer results from the polymerization of at least one conjugated diene in the presence of an anionic initiator;

b. an impact-modified plastic selected from the group consisting of high impact polystyrene, styrene-maleic anhydride copolymer, methylmethacrylate-butadiene-styrene copolymer, transparent impact polystyrene, and acrylonitrile styrene butadiene copolymer.

29. The composition as claimed in claim 28 wherein said polymer is provided with carboxylate termination by the addition of carbon dioxide.

30. The composition as claimed in claim 28 wherein Y meets the following formula: 0.45X≤Y≤0.55X.

31. The composition as claimed in claim 28 where said polymer has a bulk viscosity of >45.

32. The composition as claimed in claim 28 where X is >90 cP.

33. The composition as claimed in claim 28 where said polymer comprises a mixture of a first polymer having the formula (I):

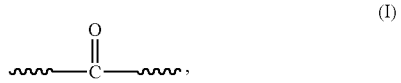

of a second polymer having the formula (II)

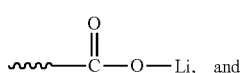

of a third polymer having the formula (III)

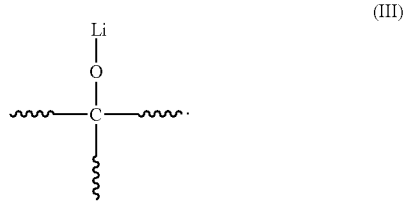

34. The composition as claimed in claim 28 wherein said ionizer an organic acid salt.

35. The composition as claimed in claim 28 wherein said ionizer is selected from the group consisting of zinc stearate, zinc oxide, aluminum stearate, and mixtures thereof.

36. The composition as claimed in claim 28 wherein said ionizer is selected from the group consisting of liquid polybutadiene and maleic anhydride functionalized liquid polybutadiene, or mixtures thereof.

37. The composition as claimed in claim 28 wherein said conjugated diene is selected from the group consisting of 1,3-butadiene, isoprene, 2,3-dimethyl-1,3-butadiene, 1,3-pentadiene, and mixtures thereof.

38. The composition as claimed in claim 28 wherein said polymer further comprises at least one additional monomer copolymerized with said at least one conjugated diene where said additional monomer is selected from the group consisting of vinyl aromatic hydrocarbons, alkenes, and mixtures thereof.

39. The composition as claimed in claim 28 wherein a polar compound is added to said carboxylate terminated polymer.

40. The composition as claimed in claim 28 wherein said polymer has a weight average molecular weight of from about 80,000 to about 350,000.

41. The composition as claimed in claim 28 wherein said polymer has a weight average molecular weight of from about 140,000 to about 200,000.

42. The composition as claimed in claim 28 wherein a vinyl modifier is used during the polymerization of the polymer to increase the vinyl content of the conjugated diene units in said carboxylate terminated polymer.

43. The composition as claimed in claim 42 wherein the vinyl modifier is selected from the group consisting of hexamethylphosphoric acid triamide, N,N,N',N'-tetramethylethylene diamine, ethylene glycol dim-ethyl ether, diethylene glycol dimethyl ether, triethylene glycol dimethyl ether, tetraethylene glycol dimethyl ether, tetrahydrofuran, 1,4-diazabicyclo[2.2.2]octane, diethyl ether, triethylamine, tri-n-butylamine, tri-n-butylphosphine, p-dioxane, 1,2-dimethoxy ethane, dimethyl ether, methyl ethyl ether, ethyl propyl ether, di-n-propyl ether, di-n-octyl ether, anisole, dibenzyl ether, diphenyl ether, dimethylethylamine, bis-oxalanyl propane, tri-n-propyl amine, trimethyl amine, triethyl amine, N,N-dimethyl aniline, N-ethylpiperidine, N-methyl-N-ethyl aniline, and N-methylmorpholine and mixtures thereof.

44. The composition as claimed in claim 28 wherein said initiator is an organolithium initiator.

45. The composition as claimed in claim 28 wherein the at least one conjugated diene is copolymerized with at least one additional monomer including vinyl aromatic hydrocarbons and alkenes.

46. An ionizer additive for a baleable polymer, the baleable polymer having a Mooney $ML_{1+4}$ viscosity at 100° C. of >35 and a solution viscosity at 25° C. of X, where X is >75 cP, the ionizer comprising:
an organic acid salt, zinc stearate, zinc oxide, aluminum stearate, liquid polybutadiene, or mixtures thereof;
wherein the addition of the ionizer to the polymer reduces the solution viscosity at 25° C. of the polymer from X to Y, wherein Y meets the following formula: 0.30X≤Y≤0.58X;
wherein the polymer results from the polymerization of at least one conjugated diene in the presence of an anionic initiator.

47. The composition of claim 28 wherein said polymer results from the batch polymerization of at least one conjugated diene in the presence of an anionic initiator.

48. The composition as claimed in claim 46 wherein said ionizer is selected from the group consisting of zinc stearate, zinc oxide, aluminum stearate, and mixtures thereof.

49. A method for controlling the solution viscosity of a polymer:
providing a carboxylate terminated baleable polymer, which includes a conjugated diene monomer, wherein the polymer has a Mooney $ML_{1+4}$ at 100° C. of >35 and a solution viscosity at 25° C. of X where X is >75 cP;
selecting a desired reduced solution viscosity;
adding at least one ionizer to reduce the solution viscosity at 25° C. of said polymer to the desired solution viscosity;
wherein the ionizer is selected from the group consisting of organic acid salt, zinc stearate, zinc oxide, aluminum stearate, liquid polybutadiene, maleic anhydride functionalized liquid polybutadiene, or mixtures thereof.

50. The method of claim 49, wherein said ionolizer is an organic acid salt.

51. The method of claim 49 wherein said ionolizer is selected from the group consisting of zinc stearate, zinc oxide, aluminum stearate, and mixtures thereof.

52. The method of claim 49 wherein the addition of the ionolizer to the polymer reduces the solution viscosity at 25° C. of the polymer from X to Y, wherein Y meets the following formula: $0.45X \leq Y \leq 0.58X$.

53. The composition of claim 46 wherein the addition of the ionolizer to the polymer reduces the solution viscosity at 25° C. of the polymer from X to Y, wherein Y meets the following formula: $0.45X \leq Y \leq 0.58X$.

54. The composition of claim 1, further comprising:
a high impact polystyrene; wherein the composition has an Izod strength of 1.0 to 2.5 and a gloss greater than 60.

* * * * *